United States Patent
Kremin et al.

(10) Patent No.: US 8,493,360 B2
(45) Date of Patent: Jul. 23, 2013

(54) QUADRATURE SIGNAL RECEIVER USING SYNCHRONIZED OSCILLATOR

(75) Inventors: Victor Kremin, Lviv (UA); Mykhaylo Krekhovelskyy, Lviv (UA); Ruslan Omelchuk, Lviv (UA); Milton Ribeiro, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 52 days.

(21) Appl. No.: 13/434,571

(22) Filed: Mar. 29, 2012

(65) Prior Publication Data

US 2013/0021291 A1 Jan. 24, 2013

Related U.S. Application Data

(60) Provisional application No. 61/509,230, filed on Jul. 19, 2011.

(51) Int. Cl.
*G06F 3/045* (2006.01)

(52) U.S. Cl.
USPC ...... 345/174; 345/179; 178/18.06; 178/19.03

(58) Field of Classification Search
USPC ............ 345/173, 174, 179; 178/18.01, 18.06, 178/19.01, 19.03
See application file for complete search history.

(56) References Cited

U.S. PATENT DOCUMENTS

| | | | |
|---|---|---|---|
| 4,273,958 A | 6/1981 | Hirata | |
| 5,149,919 A | 9/1992 | Greanias et al. | |
| 6,009,317 A | 12/1999 | Wynn | |
| 6,198,360 B1 | 3/2001 | Henrion | |
| 7,406,393 B2 | 7/2008 | Ely et al. | |
| 2005/0162411 A1* | 7/2005 | Berkel van | 345/179 |
| 2006/0012581 A1* | 1/2006 | Haim et al. | 345/173 |
| 2008/0001925 A1 | 1/2008 | Xiaoping | |
| 2008/0150917 A1 | 6/2008 | Libbey et al. | |
| 2009/0127003 A1* | 5/2009 | Geaghan | 178/18.03 |
| 2010/0155153 A1 | 6/2010 | Zachut | |
| 2010/0170726 A1 | 7/2010 | Yeh et al. | |
| 2010/0181180 A1 | 7/2010 | Peter | |
| 2011/0122087 A1* | 5/2011 | Jang et al. | 345/174 |
| 2012/0062499 A1* | 3/2012 | Weaver et al. | 345/174 |

OTHER PUBLICATIONS

Jonathan Hill, Devdas Shetty and Jun Kondo_Smart Sensor Instrumentation Development Example Including the New Paradigm of an FPGA Based System_Dated 2007_13 pages.
Roger A. Green_Quadrature Receiver Mismatch Calibration_Dated Nov. 1999_4 pages.
Search Report for U.S. Appl. No. 13/434,571, Dated Mar. 2012, 12 pages.
International Search Report for International Application No. PCT/US12/47308 dated Aug. 17, 2012; 2 pages.
Written Opinion of the International Searching Authority for International Application No. PCT/US12/47308 mailed Aug. 17, 2012; 3 pages.

* cited by examiner

*Primary Examiner* — Koosha Sharifi-Tafreshi

(57) ABSTRACT

A system comprises a processing device, a signal generator to generate a first signal and a single receiver to receive a second signal from a capacitive sense array. The single receiver is configured to process the second signal for stylus sensing of a stylus proximate to the capacitive sense array in a first mode of operation and to process the second signal for touch sensing of a passive touch object proximate to the capacitive sense array in a second mode of operation. The second signal is unsynchronized with the first signal.

18 Claims, 10 Drawing Sheets

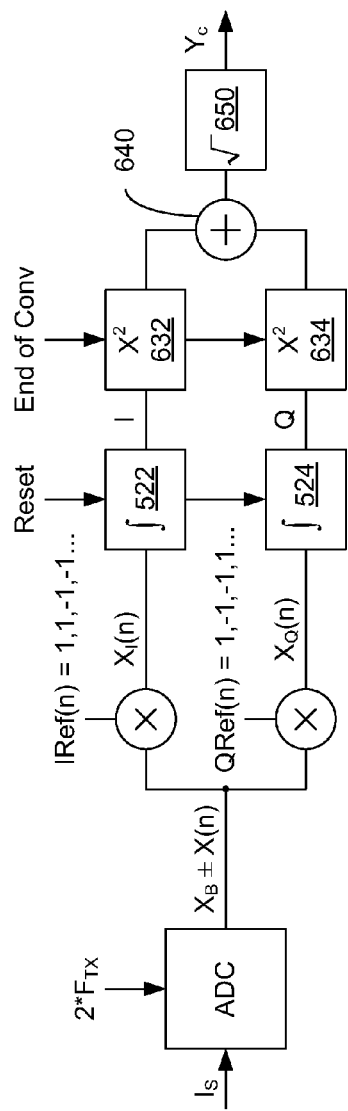
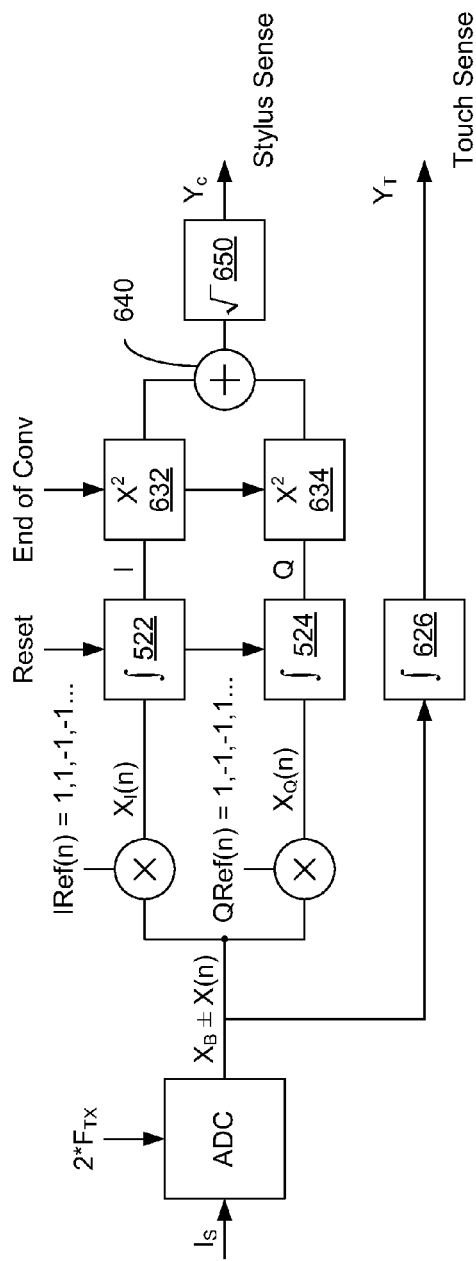
FIG. 6A
FIG. 6B

US 8,493,360 B2

QUADRATURE SIGNAL RECEIVER USING SYNCHRONIZED OSCILLATOR

RELATED APPLICATIONS

This application claims the benefit of U.S. Provisional Application No. 61/509,230 filed on Jul. 19, 2011, the contents of which are hereby incorporated by reference.

TECHNICAL FIELD

This disclosure relates to the field of user interface devices and, in particular, to capacitive sensor devices.

BACKGROUND

The use of a stylus with a touch screen interface is well established. Touch screen designs have incorporated many different technologies including resistive, capacitive, inductive, and radio frequency sensing arrays. Resistive touch screens, for example, are passive devices well suited for use with a passive stylus. Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various tethered active stylus approaches have been implemented for use with touch screens and are found in many consumer applications such as point-of-sale terminals (e.g., the signature pad used for credit card transactions in retail stores) and other public uses. However, the need for a tethered cable is a significant drawback for private applications such as personal computers ("PCs"), smart phones, and tablet PCs.

Untethered active stylus approaches are also seen in various consumer applications. In an untethered active stylus approach, the stylus may be wirelessly synchronized to a capacitive sense array. A transmitter in or coupled to the capacitive sense array provides a synchronization signal that is received by a receiver in the stylus. The transmitter may wirelessly couple the synchronization signal in a variety of ways including, inductance, radio frequency, optical, ultrasound or other mediums. The stylus receives the synchronization signal from the transmitter and generates a transmit signal, based on the synchronization signal, which is detected by the capacitive sense array. Sensing circuitry in or coupled to the capacitive sense array can detect the presence of the stylus and determine a location of the stylus based on the detected transmit signal from the stylus. Keeping synchronicity between the capacitive sense array and the stylus imposes a high burden on the system, as it has impacts on battery life, cost and design-in support.

BRIEF DESCRIPTION OF THE DRAWINGS

The present disclosure is illustrated by way of example, and not by way of limitation, in the figures of the accompanying drawings.

FIG. 6A is a block diagram illustrating a quadrature receiver for receiving unsynchronized stylus transmit signals, according to an embodiment.

FIG. 6B is a block diagram illustrating a quadrature receiver for receiving unsynchronized stylus transmit signals, with an additional parallel signal processing channel for detecting a passive touch object, according to an embodiment.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for implementing a quadrature signal receiver using a synchronized oscillator to receive a transmit signal from an unsynchronized stylus. In one embodiment, a signal generator generates a first internal transmit signal, and a single receiver receives a second stylus signal from a capacitive sense array. The single receiver may be configured to process the second stylus signal for stylus sensing of a stylus proximate to the capacitive sense array in a first stylus mode of operation. The single receiver may additionally process the second signal for touch sensing of a passive touch object (e.g., a finger) proximate to the capacitive sense array in a second finger mode of operation. In one embodiment, the second signal received from the stylus through the capacitive sense array is unsynchronized with the first internal transmit signal. The quadrature signal receiver may be configured to use the synchronized relaxation oscillator as a cycle-by-cycle ADC. The quadrature signal receiver may be further configured to process the transmit signal from the stylus in parallel with processing a touch from a passive touch object, such as a finger, by providing different demodulation algorithms for the same cycle-by-cycle ADC data stream.

Figure 1:
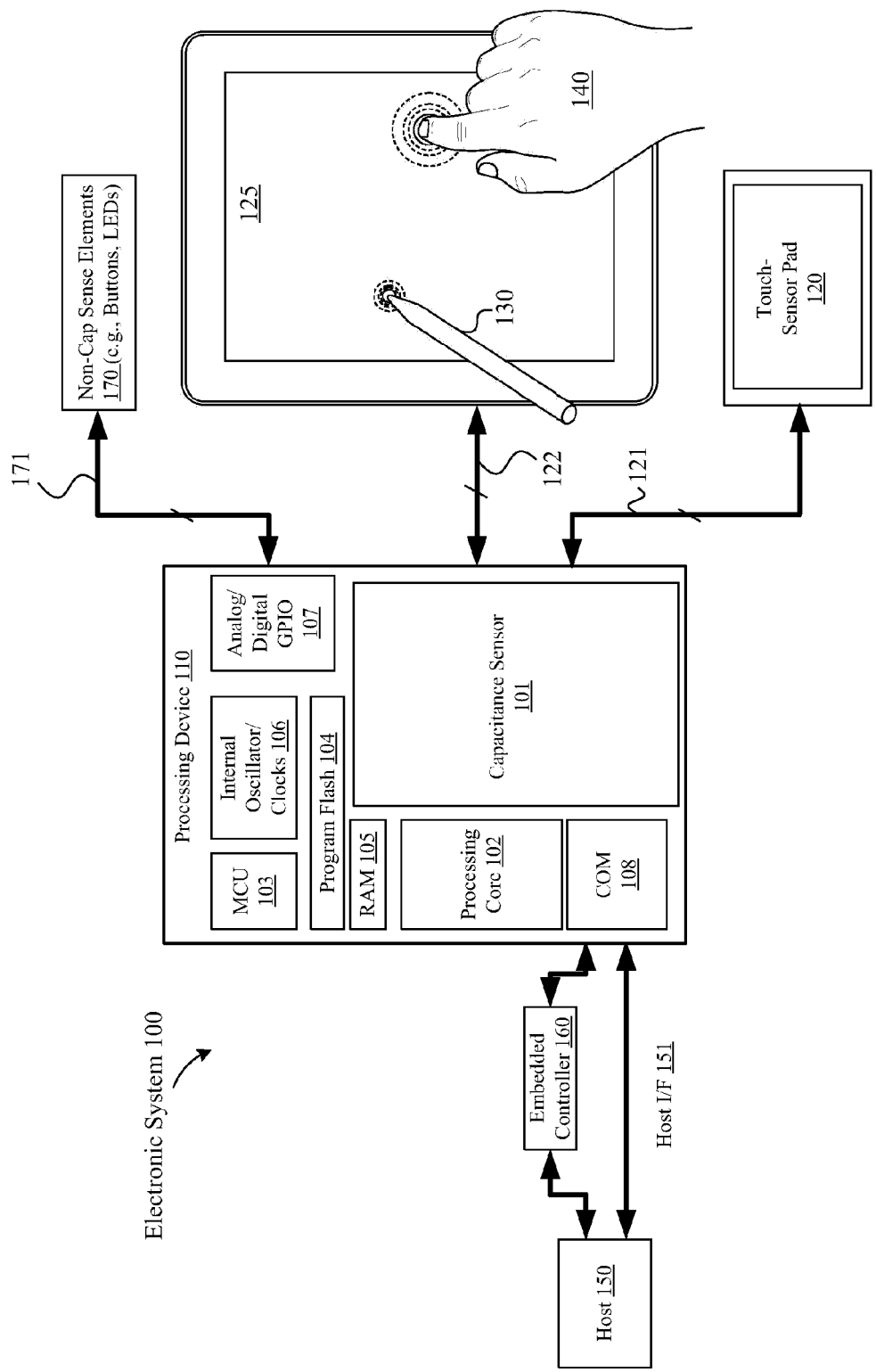
FIG. 1 is a block diagram illustrating one embodiment of an electronic system having a processing device for detecting a presence of a touch object and a stylus.

FIG. 1 is a block diagram illustrating one embodiment of an electronic system 100 having a processing device 110 for detecting a presence of a touch object 140 and a stylus 130. Electronic system 100 includes processing device 110, touch screen 125, touch sensor pad 120, stylus 130, host processor 150, embedded controller 160, and non-capacitance sense elements 170. In the depicted embodiment, the electronic system 100 includes the touch screen 125 coupled to the processing device 110 via bus 122. Touch screen 125 may include a multi-dimension capacitive sense array. The multi-dimension sense array may include multiple sense elements, organized as rows and columns. In another embodiment, the touch screen 125 operates as an all-points-addressable ("APA") mutual capacitance sense array. In another embodiment, the touch screen 125 operates as a coupled-charge receiver.

The operations and configurations of the processing device 110 and the touch screen 125 for detecting and tracking the touch object 140 and stylus 130 are described in detail below with respect to FIGS. 2A-9. In short, the processing device 110 is configured to detect a presence of the stylus 130 on the touch screen 125, as well as a presence of the touch object 140. The processing device 110 may detect and track the stylus 130 and the touch object 140 individually on the touch screen 125. In one embodiment, the processing device 110 can detect and track both the stylus 130 and touch object 140 concurrently on the touch screen 125. As described herein, the touch screen 125 capacitively couples with the stylus 130, as opposed to conventional inductive stylus applications. It should also be noted that the same assembly used for the touch screen 125, which is configured to detect touch objects 140, is also used to detect and track the stylus 130 without an additional PCB layer for inductively tracking the stylus 130 as done conventionally.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102.

The processing device 110 may also include an analog block array (not shown). The analog block array is also coupled to the system bus. Analog block array also may be configured to implement a variety of analog circuits (e.g., ADCs or analog filters) using, in one embodiment, configurable UMs. The analog block array may also be coupled to the GPIO ports 107.

As illustrated, capacitance sensor 101 may be integrated into processing device 110. Capacitance sensor 101 may include analog I/O for coupling to an external component, such as touch sensor pad 120, touch screen 125, touch-sensor slider (not shown), touch-sensor buttons (not shown), and/or other devices. Capacitance sensor 101 and processing device 110 are described in more detail below.

In one embodiment, the electronic system 100 includes a touch sensor pad 120 coupled to the processing device 110 via bus 121. Touch sensor pad 120 may include a multi-dimension capacitive sense array. The multi-dimension sense array may includes multiple sense elements, organized as rows and columns. In another embodiment, the touch sensor pad 120 is an APA mutual capacitance sense array. In another embodiment, the touch sensor pad 120 operates as a coupled-charge receiver.

In an embodiment, the electronic system 100 may also include non-capacitance sense elements 170 coupled to the processing device 110 via bus 171 and GPIO port 107. The non-capacitance sense elements 170 may include buttons, light emitting diodes ("LEDs"), and other user interface devices, such as a mouse, a keyboard, or other functional keys that do not require capacitance sensing. In one embodiment, buses 121, 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configured to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance sensor 101 may be integrated into the IC of the processing device 110, or alternatively, in a separate IC. Alternatively, descriptions of capacitance sensor 101 may be generated and compiled for incorporation into other integrated circuits. For example, behavioral level code describing capacitance sensor 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 101.

It should be noted that the components of electronic system 100 may include all the components described above. Alternatively, electronic system 100 may include only some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, and eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition, and numeric keypad operation.

Figure 2A:
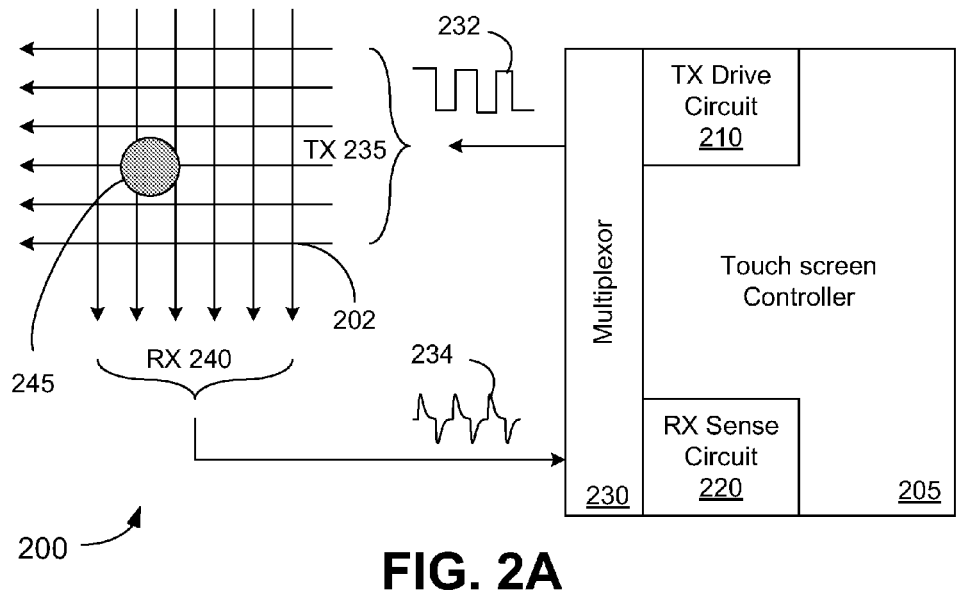
FIG. 2A is a block diagram illustrating a system including a capacitive sense array and a touch screen controller that converts measured capacitances to touch coordinates, according to an embodiment.

FIG. 2A is a block diagram illustrating one embodiment of a system 200 including the sense array 202 and a touch screen controller 205 that converts measured capacitances to touch coordinates. In an embodiment, the touch screen controller 205 is similar to the capacitance sensor 101 described above. In another embodiment, the touch screen controller 205 is the processing device 110. The sense array 202 includes TX lines 235 and RX lines 240. In an embodiment, the touch screen controller 205 includes a TX drive circuit 210, an RX sense circuit 220, and a multiplexor 230.

In an embodiment, a passive object (e.g., a finger or other conductive object) touches, or comes in close proximity to, the sense array 202 at contact point 245. The TX drive circuit 210 drives the TX lines 235 with TX signal 232. In one embodiment, TX driver circuit 210 may include a signal generator. The RX sense circuit 220 measures the RX signal 234 on RX lines 240. In an embodiment, the touch screen controller 205 determines the location of contact point 245. The TX lines 235 and RX lines 240 are multiplexed by multiplexor 230. The touch screen controller 205 provides the TX signal 232 on the TX lines 235 (rows) and measures the capacitance coupling on the RX lines 240 (columns). In an embodiment, the TX and RX lines 235, 240 are orthogonal and may be used interchangeably (e.g., transmitting on columns and receiving on rows). In an embodiment, the TX drive circuit 210 transmits the TX signal 232 through a high impedance ITO panel (TX lines 235), thus limiting the upper frequency limit and speed of the system. The total scan time may also dependent upon the number of TX lines 235 and RX lines 240 in the sense array 202. For example, the TX drive circuit 210 provides a TX signal 232 on each TX line 235 and simultaneously reads the capacitively coupled RX signal 234 on each RX line 240, according to one embodiment. In another embodiment, the RX lines 240 are multiplexed in two or more scans, as described in conjunction with FIG. 2B. This may be one (of multiple) modes of operation of touch screen controller 205 (e.g., a finger mode).

Figure 2B:
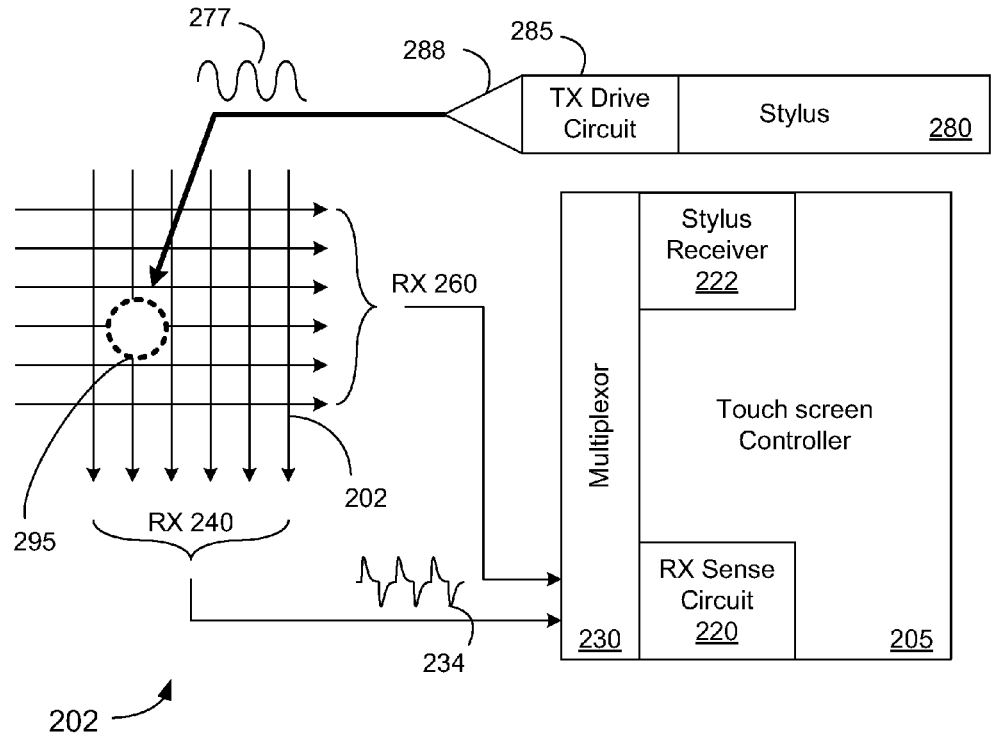
FIG. 2B is a block diagram illustrating a system including a capacitive sense array, a stylus, and a touch screen controller that converts measured capacitances to touch coordinates, according to an embodiment.

FIG. 2B is a block diagram illustrating one embodiment of a system 202 including the sense array 202, a stylus 280, and a touch screen controller 205 that converts measured capacitances to touch coordinates in another mode of operation (e.g., a stylus mode). In an embodiment, the touch screen controller 205 is similar to the capacitance sensor 101 described above. In another embodiment, the touch screen controller 205 is the processing device 110. The sense array 202 may be part of touch screen 125 or touch sensor pad 120 described above. In one embodiment, the sense array 202 may include RX lines 240 and 260. The touch screen controller 205 may include an RX sense circuit 220 and a multiplexor 230. The stylus 280 may include a TX drive circuit 285 and a stylus tip 288.

In one embodiment, the TX drive circuit 285 of stylus 280 provides a TX signal 277 directly to contact point 295 on sense array 202. The stylus tip 288 may actually touch a surface of the sense array 202 at contact point 295 or may come within a relatively close proximity of sense array 202. The RX sense circuit 220 in touch screen controller 205 may measure the RX signal 234 on both the rows (RX lines 260) and columns (RX lines 240) of sense array 202 and stylus receiver 222 may identify the presence as stylus 280. In one embodiment, the touch screen controller 205 performs a stylus scan of the sense array 202 during RX sensing of the stylus TX signal 277. For the stylus scan, the touch screen controller 205 may measure a charge being capacitively coupled to the row and column electrodes of the sense array 202 from the stylus 280. In an array of N rows and M columns, a complete scan could only include a single RX signal measurement on each row and column, or N+M scans, thus resulting in a significantly reduced stylus scanning time for the entire sense array as compared with a mutual capacitance scanning time for the entire sense array. In one embodiment, multiple RX channels can be used to sense multiple RX lines at the same time. In this case, the complete scan could be (N+M)/(# RX channels).

As described above, a passive stylus may be used as a touch object to interface with the various touch screens described above. In contrast to passive styluses, an active stylus, as described herein provides the transmit ("TX") signal 277 that is typically provided by the touch screen controller 205 in finger sensing modes. In one embodiment, the stylus 280 capacitively couples the stylus TX signal 277 to the sense array 202. In one embodiment, the stylus signal amplitude, frequency, phase, etc., may be the same or similar to that which is utilized for finger sensing by the touch screen controller 205. Alternatively, the stylus TX signal 277 may be different than the TX signal used for finger sensing in amplitude, frequency, and/or phase, and may thus be unsynchronized with TX signal 232. In another embodiment, the stylus TX signal 277 may have a different code for code modulation than a code used in the TX signal for finger sensing. In an exemplary embodiment, the stylus TX signal 277 has a greater amplitude than the finger sensing TX signal.

In one embodiment, the frequency of the stylus TX signal 277 is different than the frequency of the finger sensing TX signal. By using different TX frequencies, the touch screen controller 205 can differentiate between stylus TX signals and finger sensing TX signals. Alternatively, the touch screen controller 205 can differentiate the stylus TX signals from the TX drive circuit 210 TX signals 232 using other techniques as would be appreciated by those of ordinary skill in the art with the benefit of this disclosure, such as detecting the difference in signal characteristics (e.g., phase, frequency, amplitude, and code modulation). Various embodiments described herein are applicable to any mutual capacitance touch screen system using an untethered, or wireless active stylus configured to be capacitively coupled to the mutual capacitance array.

In one embodiment, the unsynchronized capacitive stylus receiver 222 has a low-impedance current input (i.e., RX signal 234). The low-impedance current input allows for stylus receiver input signal dependence elimination from parasitic capacitance change in the sensor electrodes of sense array 202. The sensor parasitic capacitance may change when human finger or palm is present on or near the sense array 202, however, stylus position should not be changed in this case. When the stylus receiver 222 has a low-impedance input, the changing panel parasitic capacitance may have no effect on the receiver signal. Capacitive stylus receiver 222 may further provide the narrow band sensing for out-of-band noise reduction. In one embodiment, stylus receiver 222 should provide sensing for only the stylus transmitter frequency. In addition, the receiver bandwidth should be easily controllable to eliminate the need to use more expensive ceramic or crystal oscillators. Furthermore, the stylus receiver 222 may provide ability to perform conversion within short time intervals. For example, the stylus position sensing time may take only approximately 20-30 periods of the stylus transmitter carrier signal. This allows sensing of the entire sense array 202 in a short period of time (e.g., 2 milliseconds). The touch screen controller readings may also be independent of the initial phase of the stylus transmitter carrier signal 277. This allows the receiver to provide the same readings at different initial phase conditions of the transmitter carrier signal 277.

Figure 3:
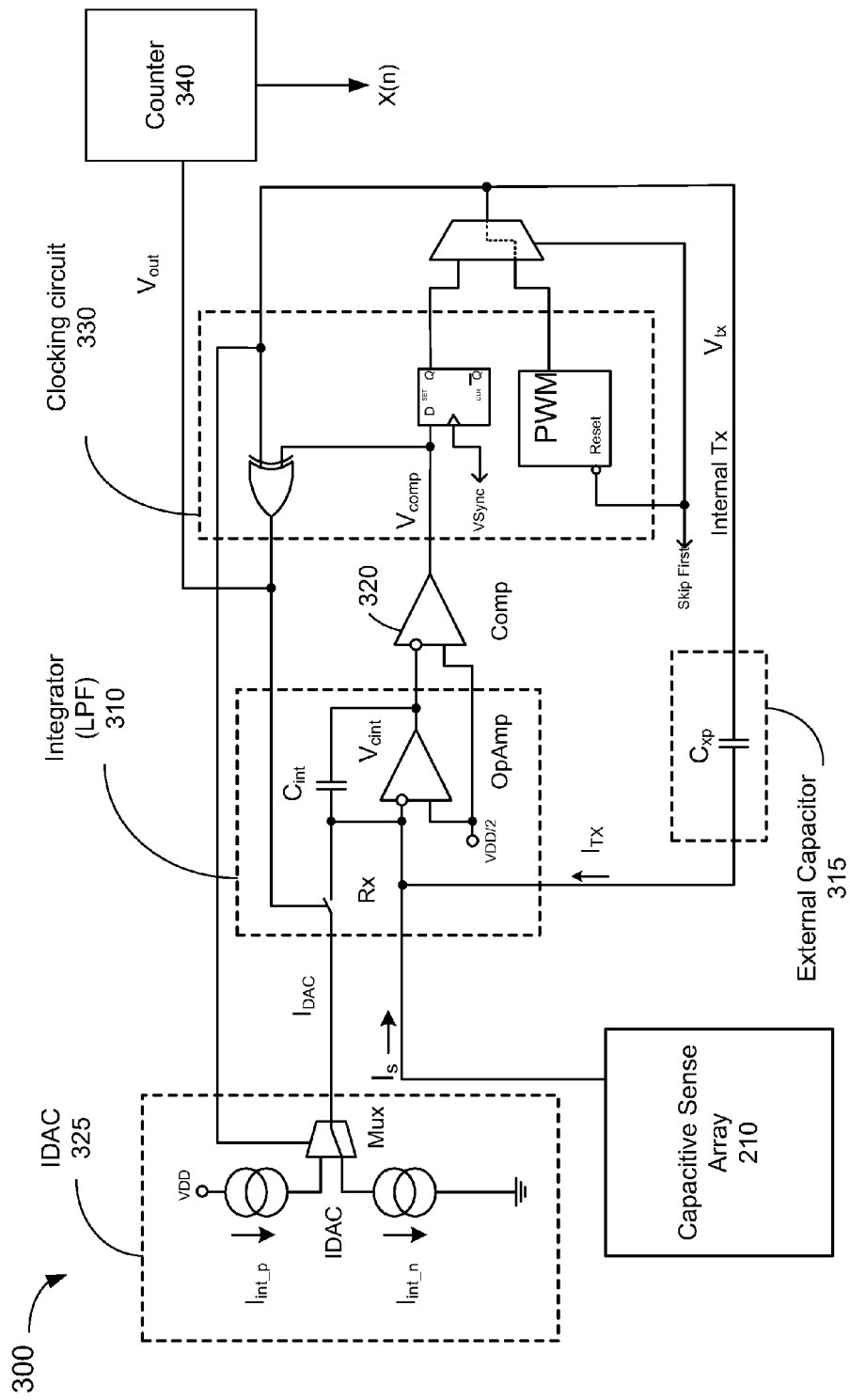
FIG. 3 is a schematic diagram illustrating a capacitance sensing channel circuit configured to function as an analog-to-digital converter (ADC), according to an embodiment.

FIG. 3 is a schematic diagram illustrating a capacitance sensing channel circuit configured to function as an analog-to-digital converter (ADC), according to an embodiment of the present invention. This capacitance sensing channel circuit 300 may be relatively low-cost and use only one integrator 310 (either active or passive), comparator 320, and counter 340 and a minimal number of logic gates. This ADC may provided cycle-by-cycle conversion abilities and may produce two numerical samples for one operation period. The ADC numerical samples may be proportional to the time intervals from the falling/rising edges of the $V_{TX}$ signal to the comparator triggering time. In one embodiment, the capacitance sensing channel circuit 300 is configured to function as a cycle-by-cycle ADC. In one embodiment, the input current $I_S$ is received from capacitive sense array 202. The input current $I_S$ may be equivalent to the RX signal 234 in FIG. 2B and may be applied to an input of integrator 310. In one embodiment, integrator 310 performing a time integration of the input current $I_S$, and measuring a total electric charge of the current. In one embodiment, for each half-period of the integrator 310, the charge from input current $I_S$ is much smaller than the charge transferred via external capacitor 315 $C_{XP}$. In one embodiment, $C_{XP}$ is a feedback capacitor connected to the internal TX signal received from a signal generator (e.g., TX drive circuit 210). In this embodiment, capacitance sensing channel circuit 300 may operate in a conventional mode without clipping or saturation caused by the unsynchronized input current $I_S$.

An output of integrator 310 may be applied to comparator 320, where the output ($V_{cint}$) of integrator 310 is compared to a reference voltage (e.g., VDD/2). The output of the comparator (Vcomp) may be applied to clocking circuit 330, which may measure a time interval of the comparator 320. The counter 340 counts the number of time intervals from both rising/falling edges of the $V_{TX}$ signal to the comparator 320 triggering. In one embodiment, the time interval of comparator 320 is directly proportional to an algebraic sum of the charge injected into the integrator 310 via external capacitor 315 $C_{XP}$ ($I_{TX}$) and from the input current $I_S$ for each half period. IDAC 325 serves a charge balancing function and may supply a current $I_{DAC}$ and internal TX line current $I_{TX}$ current flowing via $C_{XP}$ may have directions that are alternating for each operation of the half-cycle, keeping the total charge balanced for each half-cycle. This IDAC 325 may be used to provide the operational current instead of the current flowing via $C_{XP}$ 315 in other embodiments.

In one embodiment, the operation of the cycle-by-cycle ADC may include converting the DC current $I_S$. If input current $I_S$ has constant positive value, this increases the time interval for each half period when the input current $I_S$ is in the same direction as internal transmit current $I_{TX}$. Conversely, the time interval for each half period may decrease when $I_S$ and $I_{TX}$ are flowing in different directions, reducing the integrator input current. The input current $I_S$ is converted by the capacitive sensing channel circuit 300 to a value representing a time interval change $\Delta t$ from an original base level $T_B$ for the time interval. The baseline $T_B$ represents the time interval caused by the charge, flowing via capacitor $C_{XP}$. The sign of this $\Delta t$ change (i.e., + or −) may alternate each for half period. The output signal Vout may be applied to counter 340 which may convert the time intervals to corresponding numerical values $X_B$ and $\Delta X$. Counter 340 may be clocked by a high-frequency clock signal (not shown). Counter 340 may be reset at either the positive or the negative edge of the $V_{TX}$ signal. Counter 340 may count until it is disabled by the low value of the signal Vout. The next edge of $V_{TX}$ may initialize the counting cycle again. As for the one $V_{TX}$ period, counter 340 may produce two data samples triggered by rising and falling edges of this signal. $X_B$ may again represent the baseline value and $\Delta X$ is the change caused by input current $I_S$.

Figure 4A:
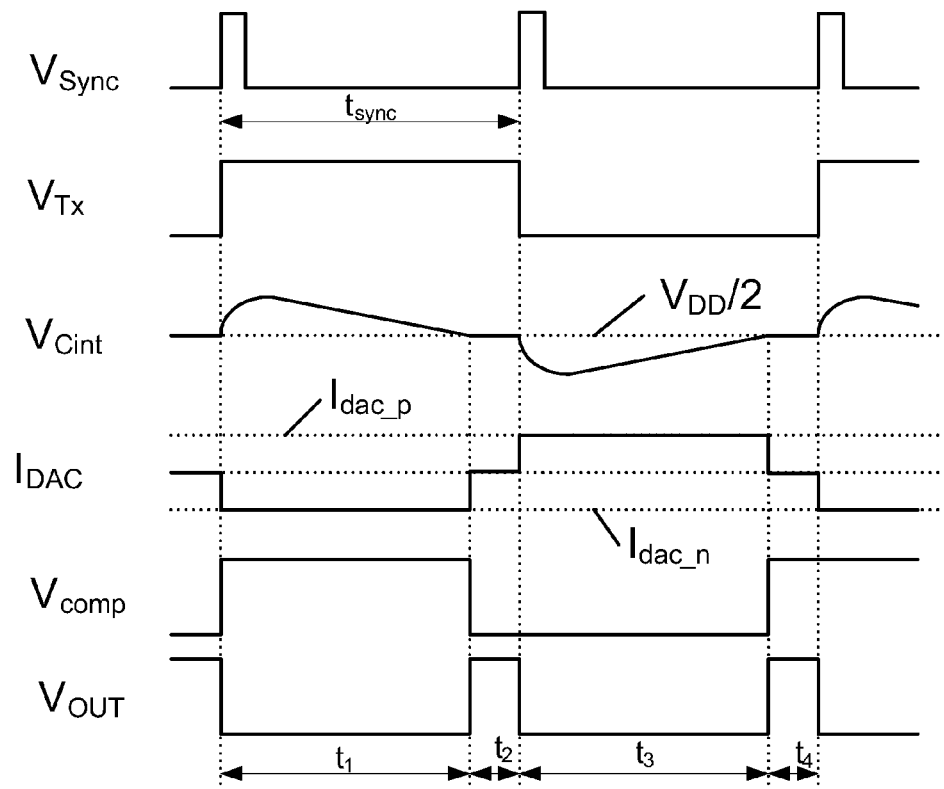
FIGS. 4A and 4B are timing diagrams illustrating the operation of a capacitance sensing channel circuit, according to an embodiment.
Figure 4B:
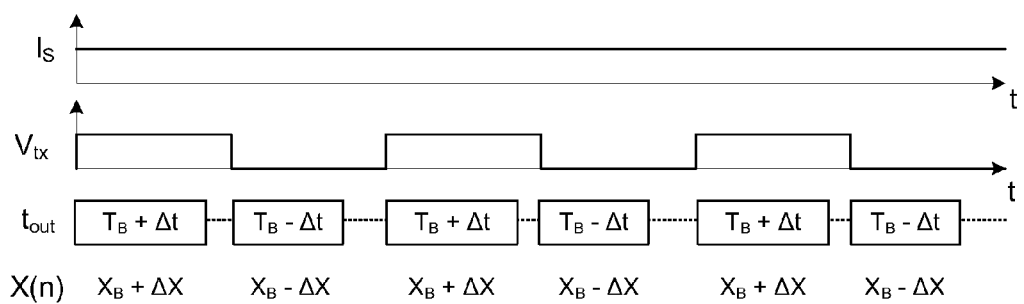

FIGS. 4A and 4B are timing diagrams illustrating the operation of capacitance sensing channel circuit 300, according to one embodiment of the present invention. As described above, the input current $I_S$ may have a constant positive value over time. The internal transmit voltage $V_{tx}$ may alternate between a high and low value when finger touch is being detected on capacitive sense array 202 and when it is not. In one embodiment, as described above, internal TX signal 232 is driven onto transmit lines 235 when touch screen controller 205 is sensing for the presence of a finger or other touch object in one mode of operation. In this case, the transmit voltage $V_{tx}$ may have a positive value. When TX signal 232 is not being driven, $V_{tx}$ may be zero or some other low value in another mode of operation (e.g., stylus mode). In one embodiment, when $V_{tx}$ has a high value, the time interval $t_{out}$ of the comparator 320 may increase (+$\Delta t$) from the baseline value $T_B$ resulting in a time interval $t_{out}$ of $T_B$+$\Delta t$. Similarly, the numerical value X(n) output from counter 340 may increase (+$\Delta X$) from the baseline value $X_B$ resulting in a value of $X_B$−$\Delta X$. Alternatively, when $V_{tx}$ has a low value, the time interval $t_{out}$ of the comparator 320 may decrease (−$\Delta t$) from the baseline value $T_B$ resulting in a time interval $t_{out}$ of $T_B-\Delta t$, and the numerical value X(n) output from counter 340 may decrease $(-\Delta X)$ from the baseline value $X_B$ resulting in a value of $X_B-\Delta X$.

Figure 5A:
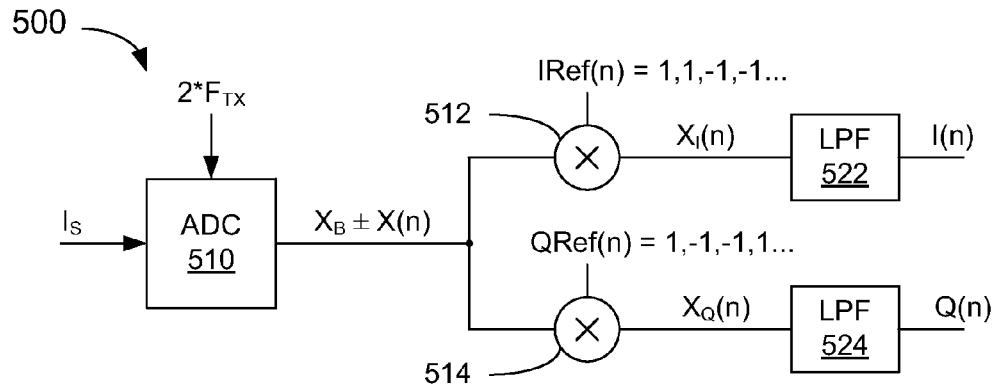
FIG. 5A is a block diagram illustrating a quadrature receiver for receiving unsynchronized stylus transmit signals, according to an embodiment.

FIG. 5A is a block diagram illustrating a quadrature receiver for receiving unsynchronized stylus transmit signals, according to an embodiment of the present invention. In one embodiment, it may be difficult to build two fully parallel receiver channels, using the same input signal (e.g., input current $I_S$), and operating in quadrature at the transmit frequency $F_{TX}$. FIG. 5A illustrates one solution of a quadrature receiver 500. In one embodiment, receiver 500 may be one example of stylus receiver 222, shown in FIG. 2B.

Figure 5B:
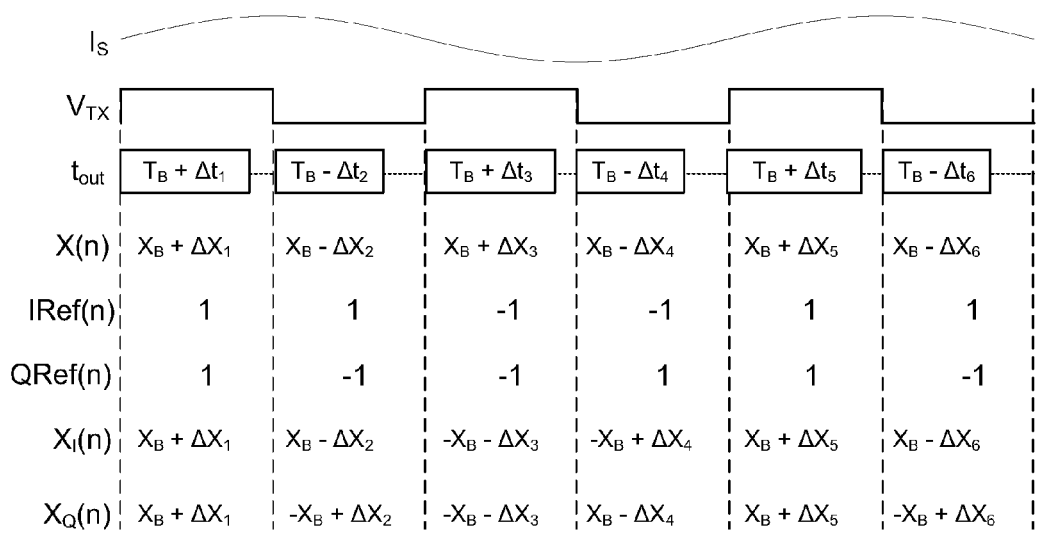
FIG. 5B is table illustrating the operation of a quadrature receiver, according to an embodiment.

In one embodiment, the input signal $I_S$ from the capacitive sense array is received by analog-to-digital converter (ADC) 510. In one embodiment, ADC 510 may include capacitance sensing channel circuit 300. ADC 510 may also receive a frequency, which may be $2*F_{TX}$. As described above, the output of ADC 510 may be a numerical value $X_B \pm \Delta X$, which corresponds to the time intervals. The output may be split into two streams (e.g., the in-phase input stream (I) and the quadrature input stream (Q)). Each input stream may be multiplied by a sequence of values of ±1. For example, the in-phase input stream may be multiplied by multiplier 512 by IRef(n)=1, 1, −1, −1, . . . and the quadrature input stream may be multiplied by multiplier 514 by QRef(n)=1, −1, −1, 1, . . . . The results of this multiplication may be identified as two quadrature streams $X_I(n)$ and $X_Q(n)$, respectively. Each of these streams $X_I(n)$ and $X_Q(n)$, may be filtered by low pass filters 522 and 524 to form the streams I(n) and Q(n) corresponding to the in-phase and quadrature components of the input signal, respectively. FIG. 5B summarizes the operation of receiver 500 in table form.

FIG. 6A is a block diagram illustrating a quadrature receiver for receiving unsynchronized stylus transmit signals, according to an embodiment of the present invention. For the demodulation sequences IRef(n)=1, 1, −1, −1, and QRef(n)=1, −1, −1, 1, . . . the receiver may have frequency peaks at the frequencies $F_{TX}/2$, $3F_{TX}/2$, $5F_{TX}/2$ . . . . Each quadrature component may contain the phase information for the input current signal $I_S$ vs. ADC sample clock $2F_{TX}$. Since the initial phase of the stylus signal is not know, this phase dependence may be eliminated from the resulting amplitude calculation. This may be accomplished by squaring the individual quadrature components. The square root unit eliminates non-linearity of the receiver response vs. input signal level. In one embodiment, the low-pass filters 522 and 524 could be implemented as integrators or simple low-pass filters.

In one embodiment, the signal sensing starts at a reset of integrators 522 and 524. After the integration of n samples the data, the integrator values I and Q are transferred to power square units 632 and 634. Power square units may square the values I and Q. The square values may then be summed 640 and a square root 650 is calculated at the end of conversion. The result $Y_C$ may be transferred, e.g., for touch coordinates calculation. This calculation may be performed by processing device 110.

The receivers described with respect to FIG. 6A may allow a capacitive sense array 202 to detect the presence of both a finger and unsynchronized stylus using a single receiver having two different modes of operation or simultaneously by adding an additional parallel processing channel, as shown in FIG. 6B. This parallel processing channel include just integrator 626 in the simplest case, as the panel 202 is excited by the $V_{TX}$ signal 232 and input current phase is known. In this situation, building an additional quadrature channel may be unnecessary and a phase-selective receiver may be sufficient. As the ADC inverts the input current $I_S$ conversion result for each half period, this operation could be represented by multiplying each data sample $X_N$ by the sequence +1, −1, +1, −1, . . . . Therefore, by just integrating (i.e., summing together) the two input data streams, we are getting a narrow band, but phase-selective, receiver with sensitivity peaks at the frequencies $1F_{TX}$, $3F_{TX}$, $5F_{TX}$, $7F_{TX}$, . . . .

Figure 7:
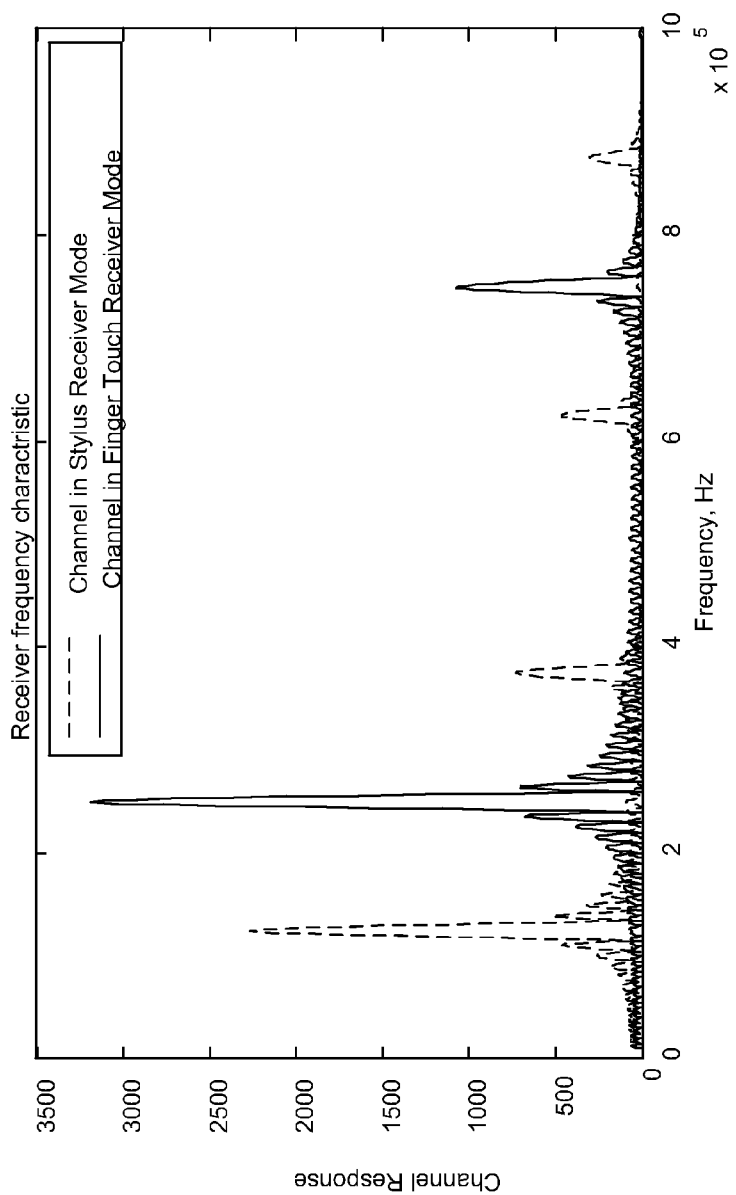
FIG. 7 is a diagram illustrating the capacitive sensing channel frequency peaks for a quadrature receiver, according to an embodiment.

Assuming that the internal transmit frequency $F_{TX}$ does not change between stylus and finger touch sensing modes, in one embodiment, the capacitive sensing channel in the touch detection mode may have a primary sensitivity peak at the $F_{TX}$ frequency with its odd harmonics at the $1F_{TX}$, $3F_{TX}$, $5F_{TX}$, $7F_{TX}$, . . . . The capacitive sensing channel in the stylus sensing mode may have a peak of the frequency response at $F_{TX}/2$ with its odd harmonics at $3/2$ $F_{TX}$, $5/2$ $F_{TX}$, $7/2$ $F_{TX}$, . . . . Therefore, the capacitive sensing channel frequency peaks in the finger receiving mode do not overlap with the inference coming from stylus transmitter, as illustrated in FIG. 7. If the stylus transmitter 285 produces odd harmonics only (e.g., expected with a rectangular, 50% duty cycle output signal), these harmonics should not interfere with receive channel in the finger sensing mode.

The different sensing modes (i.e., finger sensing and stylus sensing) differ in the cycle-by-cycle post-processing options. Since the sensing engine operation is not changed, the fundamental capacitance sensing channel setup does not change for the different modes. Using different post-processing algorithms (e.g. using the different demodulation sequences) for the same data stream allows potentially implementing fully parallel stylus and touch sensing, as parallel processing channels allow building receivers with different center frequencies. The only change is that all of the electrodes in the capacitance sense array 202 are connected to receiver inputs in the stylus scanning mode (rather that the rows being connected to a transmitter). Then the parallel data processing allows stylus and touch detection at coordinates where the receiving electrodes are connected. In one embodiment, however, upon detection of a stylus proximate to the capacitance sense array 202, stylus receiver 22, may switch to a stylus only sensing mode, which may eliminate any interference due to the possible presence of even harmonics in any stylus transmitter signal.

Alternative embodiments of a quadrature signal receiver using a synchronized oscillator may include variations on the receivers described with respect to FIGS. 5A, 6A and 6B. The variations, including using a fixed sample time interval, using the same IDAC polarity for adjacent operation half-periods, and a double balanced quadrature receiver may improve receiver performance, especially for the compensating ADC non-linearities, providing readings with input signal phase independent, etc., taking into account real component implementation characteristics and non-idealities.

In one embodiment, the integration interval variance may be caused by dependence of the integrating capacitor $C_{INT}$ discharge time on the input signal level. The discharge time of the integrating capacitor $C_{INT}$ decreases when a signal from the stylus comes in phase with the IDAC discharge current. The discharge time increases when the signal phase is opposite. The contribution of the stylus signal to the output signal varies accordingly. In one embodiment, the input signal $I_S$ is connected to the integrator 310 for a fixed period of time $t_{gate}$ to get same integration interval for each cycle. This sample time may be shorter than a minimum conversion time. The fixed interval may reduce the noise level significantly.

In another embodiment, in order to check the influence of the IDAC asymmetry on the phase characteristic irregularity a, unipolar measurement may be used. In this embodiment, an additional IDAC may be used added to charge the integrating capacitor $C_{INT}$. The additional IDAC may be connected to charge the integrating capacitor $C_{INT}$ at either edge of the signal $V_{TX}$. Another IDAC may be connected to discharge the capacitor $C_{INT}$ after the charge is completed.

In another embodiment, the formation of a parasitic DC component on the output of the receiver can be caused by quadratic non-linearities of the input circuit (e.g., mixers, ADC, etc.). This may leads to irregularity in the receiver phase characteristics (e.g., dependence of the receiver output signal amplitude on the input signal phase). To reduce the influence of the parasitic component on the receiver output, in one embodiment, a double balanced quadrature receiver may be used.

Figure 8A:
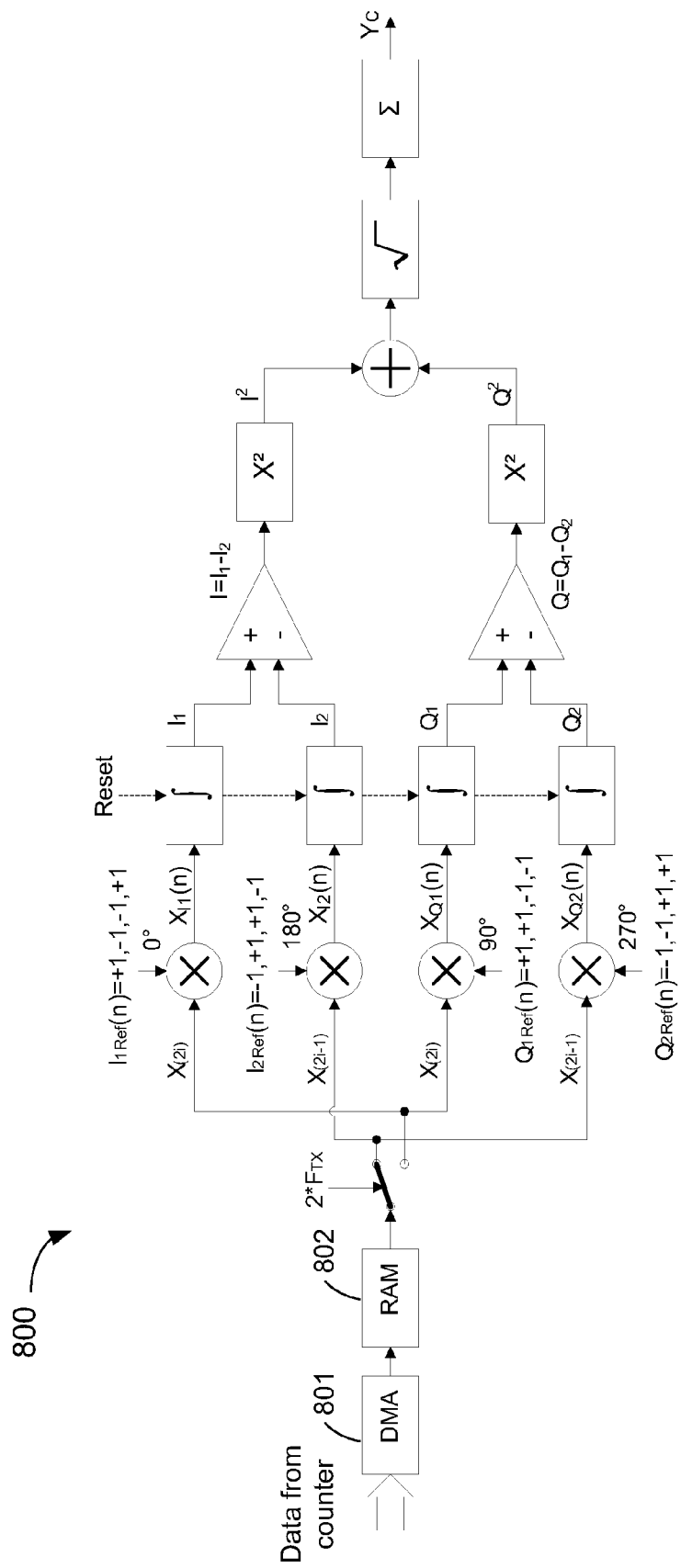
FIG. 8A is a block diagram illustrating a double balanced quadrature receiver for receiving unsynchronized stylus transmit signals, according to an embodiment.

FIG. 8A is a block diagram illustrating a double balanced quadrature receiver 800 with four parallel channels for receiving unsynchronized stylus transmit signals, according to an embodiment of the present invention. In one embodiment, the data from the counter 340 is sent to a memory (e.g., RAM 802) via the direct memory access (DMA) channel 801 after each signal Tx half-period. The input data may be divided into two streams via a switch controlled by $2*F_{TX}$. The even counts may successively multiply into orthogonal successions at 0° and 90°, while the odd counts go into orthogonal successions 180° and 270°:

$$0° \rightarrow I_{1Ref}(n)=+1,-1,-1,+1;$$

$$90° \rightarrow Q_{1Ref}(n)=+1,+1,-1,-1;$$

$$180° \rightarrow I_{2Ref}(n)=-1,+1,+1,-1;$$

$$270° \rightarrow Q_{2Ref}(n)=-1,-1,+1,+1.$$

The results of the multiplication may be applied to low-pass filters in the form of integrators, and the differential pairs I1, I2 and Q1, Q2 are obtained from the output of the integrators. The availability of differential pairs allows for suppressing the constant component on the outputs I and Q. The differential pairs may be combined, squared, summed together, and square rooted, similar to the processing discussed above. The end result may be used for additional processing to detect the presence and location of the stylus.

The double balanced quadrature detector illustrated in FIG. 8A may provide two major improvements with respect to the single balanced quadrature detector illustrated in FIG. 6. In one embodiment, double balanced quadrature receiver 800 may use a lower oversampling rate (e.g., 8/3×, rather than 4× with the single balanced receiver). In addition, double balanced quadrature receiver 800 may be less sensitive to quadratic distortion inside the ADC. Those improvements may come at the cost of a slightly higher complexity, however the performance improvements may be substantial.

In another embodiment, an estimation of the amplitude of the stylus transmit signal may be obtained using a least mean squares optimization method. This estimation may be used in receivers where synchronization between the transmitter and receiver is no available. First, a single cycle least mean squares estimator with 4× oversampling may be equivalent to the single balanced quadrature detector illustrated in FIG. 6. Second, a three-cycle least mean squares estimator may operate with the same number of samples and oversampling rate as double balanced quadrature receiver 800, but may deliver superior performance.

Least mean squares is an optimization technique with a wide breadth of applications. In one embodiment, the technique may be used for sinewave amplitude estimation, to identify the most likely sinewave, of a known frequency, that fits a given dataset. The parametric model of a sinewave of known periodicity is given by the formula:

$$f(t)=A \sin(w_0 t)+B \cos(w_0 t)+C$$

where $T_0=2\pi/W_0$ defines the period and $\sqrt{(A^2+B^2)}$ is the amplitude. For purposes of discussion $T_1$ may represent the sampling period. The least mean squares technique may including finding the parameters of the function f(t) that minimize the cost.

Figure 8B:
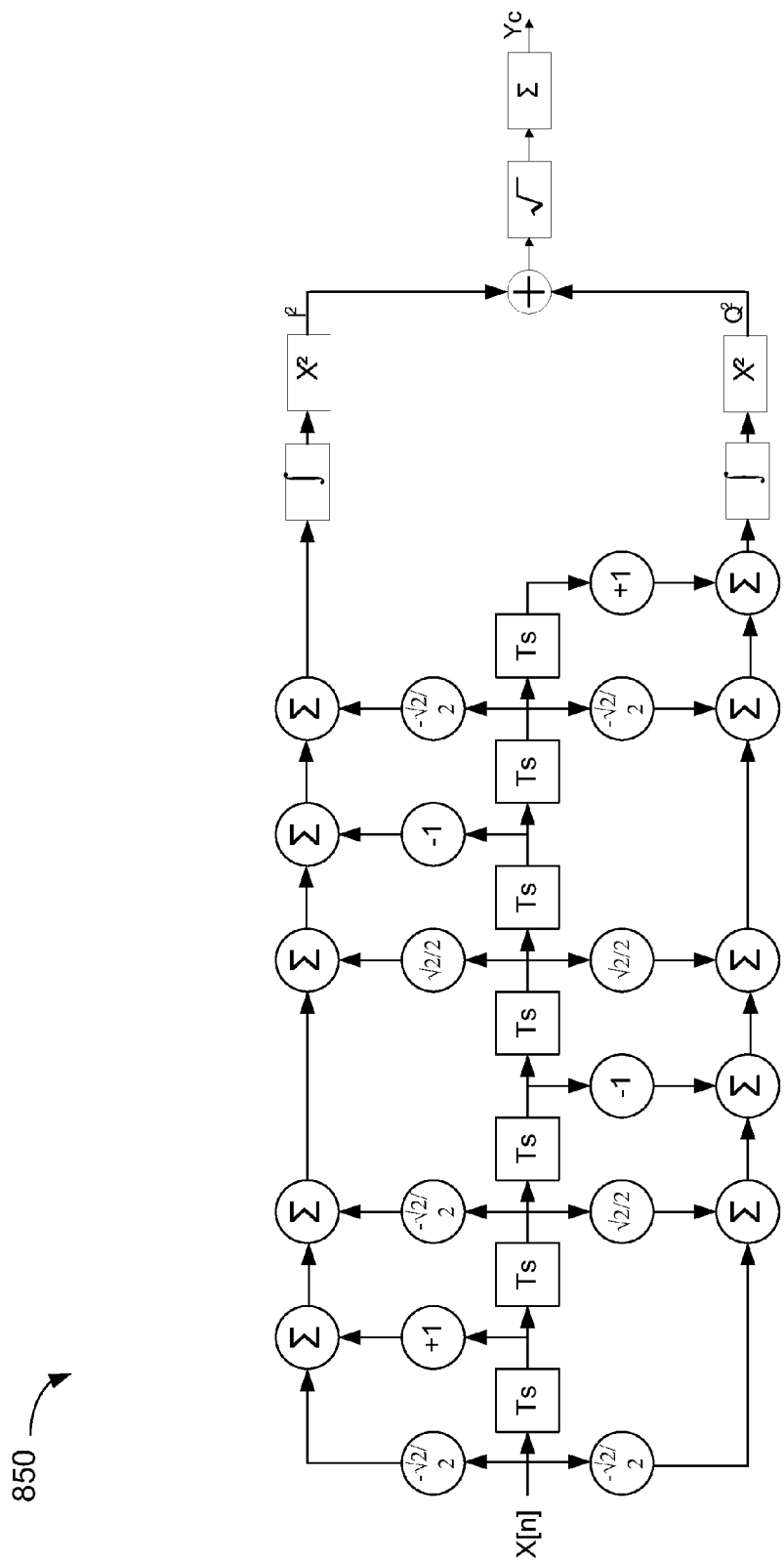
FIG. 8B is a diagram illustrating the data flow for a three-cycle least mean squares estimator, according to an embodiment.

In one embodiment, the three-cycle least mean squares estimator operations over 8 samples and 3 cycles of the input signal $I_S$. In order to estimate the amplitude using double balanced quadrature receiver 800, it may be determine that a different multiplication sequence may yield optimal results. For example, the multiplication sequence may include the values 0, $\sqrt{2}/2$, $-1$, $\sqrt{2}/2$, 0, $-\sqrt{2}/2$, 1, $-\sqrt{2}/2$ ..., where the sequence is shifted according to the appropriate processing stream. FIG. 8B illustrates the data flow for a three-cycle least mean squares estimator, according to an embodiment of the present invention. In one embodiment, the front-end of data flow 850 includes the accumulation of 8 samples of the input signal, 8 multiplications, followed by 10 additions. The back-end of data flow 850 includes 2 multiplications followed by an addition and a square-root operation. Each set of 8 samples may produce one estimate of the signal amplitudes. The three-cycles least mean squares estimator may be insensitive to the phase of the input signal when there is perfect operating frequency matching. It is improbable that such a frequency match happens between two unsynchronized systems, however. Frequency mismatch introduces a dependency of the amplitude estimation on the phase of the input signal. Within the frequency range of +/−4% of the nominal frequency, an error of approximately 14% may be realized. Sensitivity to the phase can be minimized by increasing the integration time. By averaging the estimator output over 32 estimates, the maximum error over the frequency range of interest can be reduced to approximately under 0.4%.

In one embodiment, three-cycle least mean squares estimation may present a maximum signal sensitivity of ⅜ of the sampling frequency. The estimator may also be immune to DC offsets and offer high immunity to quadratic distortion.

Figure 9:
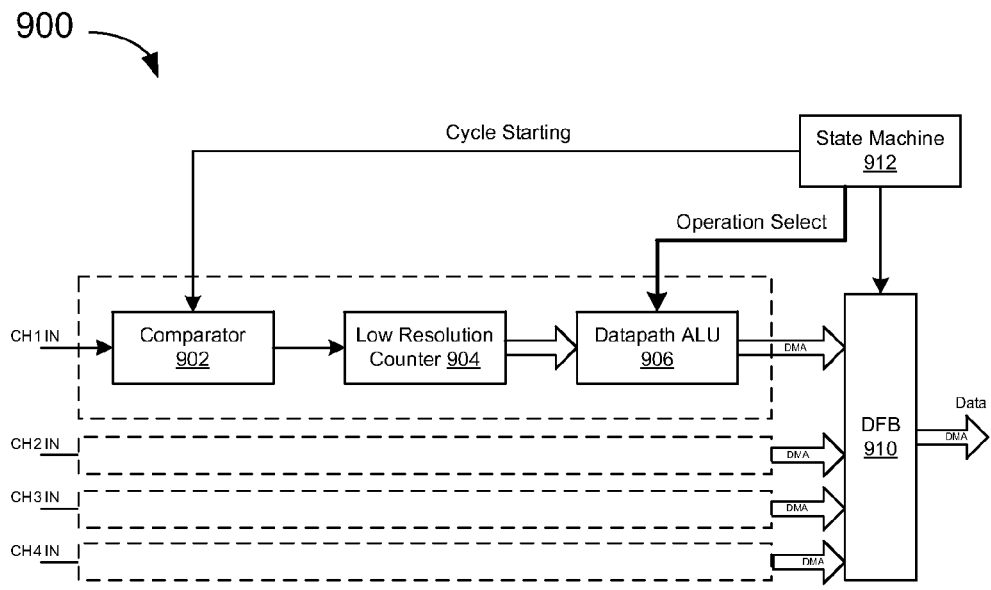
FIG. 9 is a block diagram illustrating an implementation option for a multi-channel quadrature signal receiver using multiple synchronized oscillators, according to an embodiment.

FIG. 9 is a block diagram illustrating an implementation option for a multi-channel quadrature signal receiver using multiple synchronized oscillators, according to an embodiment of the present invention. This implementation is a resource effective implementation for PSoC3/5 microcontrollers produced by Cypress Semiconductor. Multiple implementation options may be considered for the practical receiver implementation. Taking into account that only additions and subtractions need to be performed for each operation cycle, in one embodiment, a datapath arithmetic logic unit (ALU) may be used for this purpose. The accumulation results, squaring, and square root calculation may be provided by the digital filter block (DBF). Taking into account the limited expected dynamic range of the stylus signals, the square root could be calculated by iteration or a using series representation. This should be very fast and provide good accuracy.

In one embodiment, the receiver 900 includes multiple channels CH1, CH2, CH3, CH4. For each channel, the output of comparator 902 is connected to the enable input of a low-resolution counter 904 (e.g. 4 bits). This low-resolution counter 904 may operate at the maximum speed for channel quantization error reduction. The accumulation steps may be performed by ALU 906, taking into account that ALU 906 is not able to operate at the full low-resolution counter speed.

The ALU operation sequence may be, for example, 1, 1, 1, 1, 1, . . . , −1, −1, −1, −1, −1, . . . ALU 906 performs quadrature sum accumulation and transfers the results to the DFB 910 using DMA when the accumulation is complete. A state machine 912 may control 4 different datapath ALUs, control internal operation cycles and initialize the results of the processing by DFB 910. Other implementations could use single ALU 906 for all channels. The output of DFB 910 may be provided to additional touch detection circuitry.

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing devices.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. An apparatus, comprising:
   a processing device;
   a signal generator coupled to the processing device and configured to generate a first signal; and
   a single receiver coupled to the processing device and configured to receive a second signal from a capacitive sense array, the single receiver comprising a first processing stream to process an in-phase component of the second signal and a second processing stream to process a quadrature component of the second signal, wherein the single receiver is configured to process the second signal for stylus sensing of a stylus proximate to the capacitive sense array in a first mode of operation and to process the second signal for touch sensing of a passive touch object proximate to the capacitive sense array in a second mode of operation, wherein the second signal is unsynchronized with the first signal in the first and second modes of operation.

2. The apparatus of claim 1, wherein the processing device is configured to switch the single receiver to the first mode in response to detecting the stylus proximate to the capacitive sense array, wherein the first mode comprises a stylus only sensing.

3. The apparatus of claim 1, wherein the processing device is configured to process an output of the single receiver to determine a location of the stylus proximate to the capacitive sense array based on the second signal.

4. The apparatus of claim 1, wherein the single receiver comprises a cycle-by-cycle analog-to-digital converter (ADC) configured to process a half-period conversion result of a cycle for full-wave synchronous detection using the first signal as a reference signal.

5. The apparatus of claim 1, wherein the first processing stream comprises a first multiplier to multiply the in-phase component by a first sequence and a first low pass filter coupled to an output of the first multiplier, and wherein the second processing stream comprises a second multiplier to multiply the quadrature component by a second sequence and a second low pass filter coupled to an output of the second multiplier, wherein the second sequence comprises a phase shifted version of the first sequence.

6. The apparatus of claim 5, wherein the first sequence and the second sequence are determined using a least mean squares optimization technique.

7. A method comprising:
   generating a transmit signal;
   receiving, by a single receiver, a receive signal from a capacitive sense array; and
   processing, by the single receiver, the receive signal for stylus sensing of a stylus proximate to the capacitive sense array in a first mode of operation and processing the receive signal for touch sensing of a passive touch object proximate to the capacitive sense array in a second mode of operation, wherein processing the receive signal processing an in-phase component of the receive signal in a first processing stream and processing a quadrature component of the receive signal in a second processing stream, and wherein the receive signal is unsynchronized with the transmit signal in the first and second modes of operation.

8. The method of claim 7, further comprising:
   switching the single receiver to the first mode in response to detecting the stylus proximate to the capacitive sense array, wherein the first mode comprises a stylus only sensing mode.

9. The method of claim 7, further comprising:
processing an output of the single receiver to determine a location of the stylus proximate to the capacitive sense array based on the receive signal.

10. The method of claim 7, wherein the single receiver comprises a cycle-by-cycle analog-to-digital converter (ADC) configured to process a half-period conversion result of a cycle for full-wave synchronous detection using the transmit signal as a reference signal.

11. The method of claim 7, wherein processing the receive signal for stylus sensing comprises:
determining a time interval of the receive signal; and
converting the time interval into a numerical value, wherein the numerical value is expressed as a difference from a baseline value.

12. The method of claim 7, wherein processing the receive signal for stylus sensing comprises:
multiplying the in-phase signal component by a first sequence to generate an in-phase value;
multiplying the quadrature signal component by a second sequence to generate a quadrature value, wherein the second sequence is a phase-shifted version of the first sequence;
filtering each of the in-phase value and the quadrature value; and
combining the filtered in-phase value with the filtered quadrature value.

13. The method of claim 12, wherein the first sequence and the second sequence are determined using a least mean squares optimization technique.

14. A system comprising:
a capacitive sense array;
a stylus; and
a sensing device coupled to the capacitive sense array, wherein the sensing device comprises:
a signal generator configured to generate a first signal; and
a single receiver configured to receive a second signal from the capacitive sense array, the single receiver comprising a first processing stream to process an in-phase component of the second signal and a second processing stream to process a quadrature component of the second signal, wherein the single receiver is configured to process the second signal for stylus sensing of the stylus proximate to the capacitive sense array in a first mode of operation and to process the second signal for touch sensing of a passive touch object proximate to the capacitive sense array in a second mode of operation, wherein the second signal is unsynchronized with the first signal in the first and second modes of operation.

15. The system of claim 14, wherein the sensing device is configured to switch the single receiver to the first mode in response to detecting the stylus proximate to the capacitive sense array, wherein the first mode comprises a stylus only sensing mode.

16. The system of claim 14, wherein the sensing device is configured to process an output of the single receiver to determine a location of the stylus proximate to the capacitive sense array based on the second signal.

17. The system of claim 14, wherein the single receiver comprises a cycle-by-cycle analog-to-digital converter (ADC) configured to process a half-period conversion result of a cycle for full-wave synchronous detection using the first signal as a reference signal.

18. The system of claim 14, wherein the first processing stream comprises a first multiplier to multiply the in-phase component by a first sequence and a first low pass filter coupled to an output of the first multiplier, and wherein the second processing stream comprises a second multiplier to multiply the quadrature component by a second sequence and a second low pass filter coupled to an output of the second multiplier, wherein the second sequence comprises a phase shifted version of the first sequence.

* * * * *